(12) United States Patent
Boulay et al.

(10) Patent No.: US 7,091,835 B2
(45) Date of Patent: Aug. 15, 2006

(54) VEHICLE LOCATION SYSTEM USING A KINETIC NETWORK

(75) Inventors: André Eric Boulay, Beaconsfield (CA); Robert Nelson, Hampstead (CA)

(73) Assignee: Boomerang Tracking, Inc., Montreal (CA)

( * ) Notice: Subject to any disclaimer, the term of this patent is extended or adjusted under 35 U.S.C. 154(b) by 0 days.

(21) Appl. No.: 10/626,119

(22) Filed: Jul. 23, 2003

(65) Prior Publication Data

US 2004/0130440 A1 Jul. 8, 2004

(30) Foreign Application Priority Data

Jul. 23, 2002 (CA) ................................. 2394770

(51) Int. Cl.
*B60R 1/00* (2006.01)

(52) U.S. Cl. .................... 340/426.19; 340/426.12; 340/426.16; 340/426.18; 340/426.22; 340/426.28; 340/902; 340/905; 701/36

(58) Field of Classification Search ............. 340/426.1, 340/426.12, 426.16, 426.22, 428, 902, 905, 340/426.18; 701/36; 307/10.1
See application file for complete search history.

(56) References Cited

U.S. PATENT DOCUMENTS 5,805,055 A 9/1998 Colizza ...................... 340/426

6,236,337 B1 * 5/2001 Beier et al. .................. 340/905
6,374,079 B1 4/2002 Hsu ........................... 455/11.1
6,490,513 B1 * 12/2002 Fish et al. ..................... 701/35

FOREIGN PATENT DOCUMENTS

| EP | 1039689 | 9/2000 |
| EP | 1174728 | 1/2002 |
| EP | 1191798 | 3/2002 |
| WO | WO 0126068 | 4/2001 |

* cited by examiner

*Primary Examiner*—Julie Bichngoc Lieu
(74) *Attorney, Agent, or Firm*—Iandiorio & Teska

(57) ABSTRACT

An on-board unit for a vehicle is disclosed. The unit includes a primary communication system, the primary communication system being adapted to communicate with a remote location, and being further adapted to detect a stolen condition or receive an indication of a stolen condition. The unit also includes a process for determining whether communication with a central location can be effected. A secondary communication system is provided, the secondary communication system transmitting a signal including an identification of the on-board unit when communication with the central location cannot be effected. This signal is received by a receiver, which is in direct or indirect communication with the central location, so that the central location can take the appropriate steps to recover the vehicle which includes the on-board unit that is emitting the signal.

17 Claims, 2 Drawing Sheets

VEHICLE LOCATION SYSTEM USING A KINETIC NETWORK

FIELD OF THE INVENTION

The present invention relates to a vehicle location system using a kinetic network, and more specifically to a vehicle locator device which can send information to another device when the vehicle locator device cannot or is not adapted to communicate with a wireless network.

DESCRIPTION OF THE PRIOR ART

Vehicle location systems are becoming well known in the art. One such system is described in U.S. Pat. No. 5,895,436 (Savoie). In that system, a unit is placed on board a vehicle. When the unit determines that the vehicle has been stolen, or when the owner of the vehicle reports the vehicle as being stolen, a signal is sent to the unit on board the vehicle, and in the solution taught in that patent, a cellular line is opened, which can be tracked by a tracking vehicle. Improvements to this system include a beacon which is located separately or on board the unit and which can be tracked by the tracking vehicle even if the wireless tracking system is jammed, removed, or otherwise not functioning, avoiding the use of costly cellular communications. Other improvements have included two-way communication between the unit on board the vehicle and other sources. This permits, for instance, the unit to verify if an authorized transponder is located adjacent the vehicle. If not, the unit auto-determines that the vehicle has been stolen. Alternatively, a motion sensor can be provided on board the vehicle. Unauthorized movement of the vehicle will trigger the on-board unit to signal a central location that the vehicle has been stolen and is in need of being tracked.

One of the issues that arises with such systems is that wireless network coverage is not universal, and is generally not available in remote locations. Furthermore, some wireless networks cannot communicate in certain circumstances (deep within underground garages, for example). Thieves are also becoming more sophisticated and are equipped with jammers, which jam wireless signals.

Consequently, there can be times when the on-board units "know" the vehicle has been stolen, and are emitting the proper signals, but these signals are not being received by a central location since there is no communication. It is thus almost impossible to locate such vehicles.

SUMMARY OF THE INVENTION

It is an object of the invention to provide an on-board unit with a means for sending and receiving information to and from devices which are not part of a traditional wireless network carrier's infrastructure. Thus, the devices in the vehicles become a mobile wireless network. When one of these devices encounters an activated transmitter, the device sends a signal through the traditional wireless network, revealing the last position of where it saw the activated transmitter. The activated transmitter can emit a signal which is received by a device which in turn can communicate with the central location directly or indirectly, and provide the central location with the identification of the on-board unit, as well as the device's location for generally locating the on-board unit.

In accordance with the invention, this object is achieved with an on-board unit for a vehicle comprising:

a primary communication system, said primary communication system being adapted to communicate with a remote location, said primary communication system being further adapted to detect a stolen condition or receive an indication of a stolen condition;

means for determining whether communication with a central location can be effected; and a secondary communication system, said secondary communication system transmitting a signal including an identification of said on-board unit when communication with said central location cannot be effected.

This signal is received by a receiver, which is in direct or indirect communication with the central location, so that the central location can take the appropriate steps to recover the vehicle which includes the on-board unit that is emitting the signal.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 2:
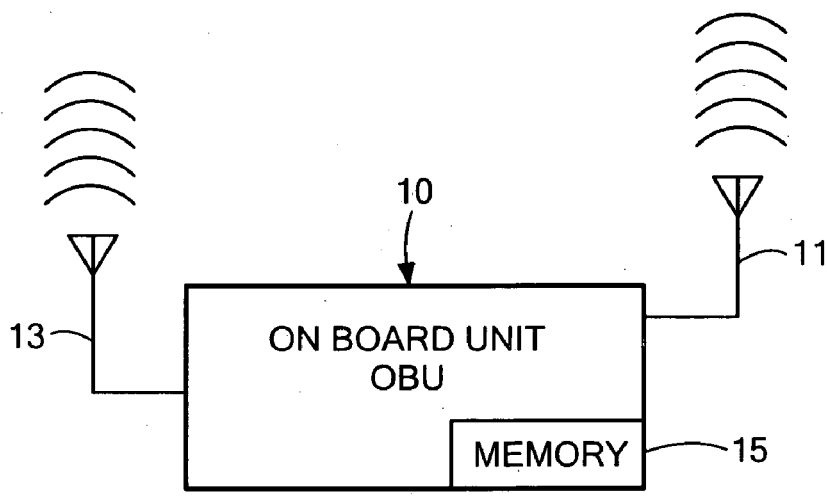
FIG. 2 is a schematic representation of an on-board unit according to a preferred embodiment of the invention.
Figure 3:
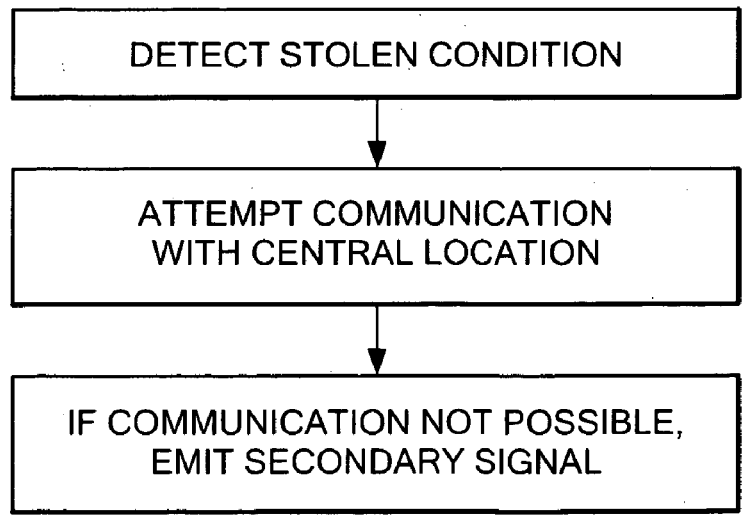
FIG. 3 is a schematic representation of the steps for activating a secondary signal of the on-board unit according to a preferred embodiment of the invention.

Referring now to FIG. 2, there is shown an on-board unit for locating a stolen vehicle according to a preferred embodiment of the invention. As the on-board unit is known in the art, only its features useful for the present invention will be discussed herein.

On board unit 10 includes a primary communication system 11 for communicating with a central location. This system is more particularly described in U.S. Pat. No. 5,895,436, the contents of which are hereby incorporated by reference, and in international applications nos. PCT/CA01/00130 and PCT/CA01/01334, in the name of the same assignee. However, it should be understood that the present invention is not limited to such on-board units, and that different on-board units can benefit from the teachings of the present invention.

The on-board unit 10 is also provided with another communication system 13, which forms part of the present invention. Preferably, on-board unit 10 is also provided with a memory. The other communication system 13 can be integrated into the on-board unit 10, or advantageously can be separate from the on-board unit and in wireless communication therewith.

The other communication system 13, or secondary system 13, is adapted to send, over an RF band, a message containing an identification of the on-board unit 10. Preferably, the message can also contain other status information, such as the fact that the on-board unit 10 is located on a vehicle that has been stolen, and advantageously information about the status of the vehicle if the on-board unit 10 is in communication with other systems present on the vehicle. For example, the on-board unit could be interfaced with the vehicle's computer, with a microphone located inside the vehicle, with a camera located inside the vehicle, etc.

This secondary system 13, which is adapted to send and receive, is activated when the on-board unit 10 has failed to communicate with a central location. The system of the present invention is thus particularly adapted to be used with a vehicle location device which "knows" whether or not the vehicle has been stolen or one that has received an indication that the vehicle has been stolen, for example from a central location.

Alternatively, when the on-board unit has failed to communicate with the central location, there is a presumption that the vehicle including the unit 10 is either out-of-range of the wireless network, or has had its transmitter disabled or torn out.

When this condition occurs, the unit 10 activates the secondary communication system 13. The secondary communication system thus emits a signal.

Figure 1:
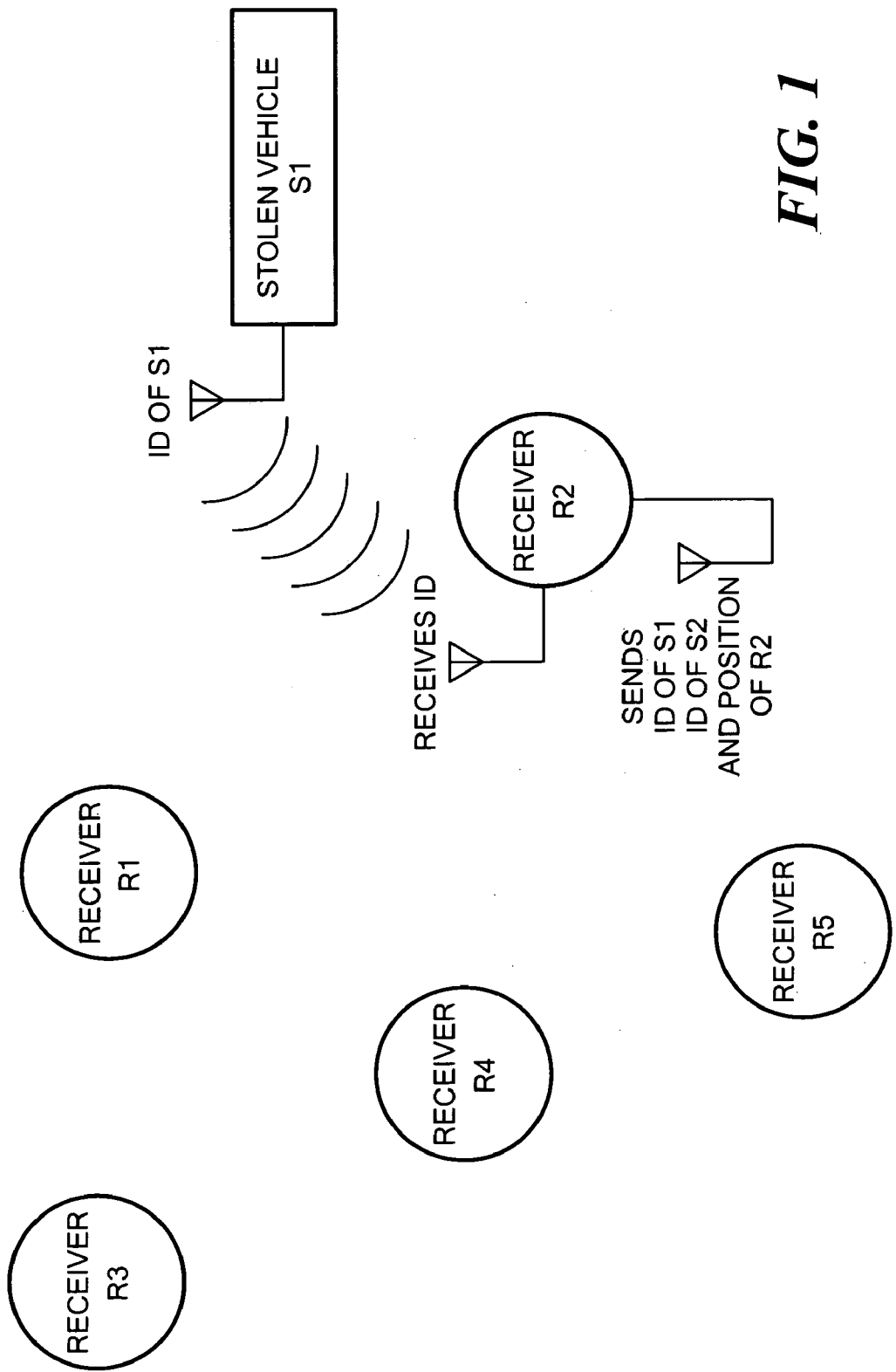
FIG. 1 is a schematic representation of a stolen vehicle S1, and a plurality of receivers located in the vicinity of S1.

The emitted signal by the secondary system 13 is received by a device which can communicate directly or indirectly with the central location. This device or receiver, denoted R on FIG. 1, can be a wireless telephone, a personal digital assistant with wireless communication means, a dedicated device or a vehicle location unit, or an on-board unit 10 such as a unit sold under the trade-mark BOOMERANG®. When the receiver R is proximate the on-board unit 10, it receives the ID of the on-board unit 10. For example, in FIG. 1, R2 is located proximate S1 and receives the ID of the on-board unit 10. If R2 can communicate with the central location, it relays to the central location its own ID, its location and the ID of S1. Consequently, the central location can take the appropriate measures to attempt to locate the stolen vehicle S1. If however R2 cannot communicate with the central location, i.e. it is out of range itself, or it is being jammed, it stores in its internal memory the ID of S1, and will send it to the central location as soon as communication with the central location can be established. Advantageously, if the receiver R2 is provided with geo-positioning means, it can also store the coordinates and time at which the signal emanating from S1 were received, to facilitate the work of the tracking vehicle.

In an advantageous embodiment of the invention, each vehicle in a fleet of vehicles, for example a fleet of delivery vehicles, could be equipped with receivers. Since these vehicles are constantly in motion in a relatively large geographic area, the plurality of receivers acts as a "kinetic network".

Although the present invention has been explained hereinabove by way of a preferred embodiment thereof, it should be pointed out that any modifications to this preferred embodiment within the scope of the appended claims is not deemed to alter or change the nature and scope of the present invention.

The invention of the claimed is:

1. An on-board unit for a vehicle comprising:
   a primary communication system, said primary communication system being adapted to communicate with a remote location, said primary communication system being further adapted to detect a stolen condition or receive an indication of a stolen condition;
   means for determining whether communication with a central location can be effected; and
   a secondary communication system, said secondary communication system transmitting a signal including an identification of said on-board unit when communication with said central location cannot be effected.

2. An on-board unit according to claim 1, wherein said primary communication system and said secondary communication system are integrated into a single unit.

3. An on-board unit according to claim 1, wherein said primary communication system and said secondary communication system are separate from each other and in wireless communication with each other.

4. An on-board unit according to claim 1, wherein said on-board unit further includes a receiver for receiving a signal emitted by a second on-board unit, said on-board unit further including means for determining a position of said second on-board unit and for preparing a message including an identification of said second on-board unit, a time and location of receiving said identification of said second on-board unit and an identification of said second on-board unit, said message being transmitted to said central location when communication with said central location can be effected.

5. An on-board unit according to claim 4, wherein said message is stored in a memory until communication with said central location can be effected.

6. A system for locating a stolen vehicle comprising:
   at least one vehicle being equipped with an on-board unit according to claim 1; and
   a plurality of receivers adapted to receive said signal, at least one of said receivers being located on another vehicle.

7. A system according to claim 6, wherein said system further includes a plurality of vehicles, at least one of said vehicles being equipped with an on-board unit according to claim 4.

8. An on-board unit according to claim 1, wherein said unit further includes a beacon, said beacon being activated when communication with said central location cannot be effected.

9. An on-board unit according to claim 4 in which said receiver includes a receiver chosen from the group consisting of: a wireless telephone, a personal digital assistant with wireless communication means, a dedicated device, a vehicle location unit, and an on-board unit.

10. The system of claim 7 in which said plurality of vehicles define a kinetic network.

11. A vehicle location system comprising:
    an on-board unit comprising:
       a primary communication system, said primary communication system being adapted to communicate with a remote location, said primary communication system being further adapted to detect a stolen condition or receive an indication of a stolen condition;
       means for determining whether communication with a central location can be effected, and
       a secondary communication system, said secondary communication system transmitting a signal including an identification of said on-board unit when communication with said central location cannot be effected; and
    one or more receivers for receiving a signal emitted by said on-board unit including means for determining a position of said on-board unit and for preparing a message including an identification of said on-board unit, a time and location of receiving said identification of said on-board unit and an identification of said on-board unit, said message being transmitted to said central location when communication with said central location can be effected.

12. The system of claim 11 in which said one or more receivers is a receiver chosen from the group consisting of: a wireless telephone, a personal digital assistant with wireless communication means, a dedicated device, a vehicle location unit and an on-board unit.

13. The system of claim 12 further including one or more vehicles equipped with said one or more receivers.

14. The system of claim 11 further including one or more vehicles equipped with said on-board unit.

15. A method for detecting the location of a vehicle comprising:
   detecting a stolen condition of a vehicle equipped with an on-board unit;
   attempting to communicate the stolen condition to a central location;
   determining communication with the central location cannot be effected; and
   sending a signal including an identification of the on-board unit when communication with the central location cannot be effected.

16. The method of claim 15 further including the step of employing a receiver that receives the signal including an identification of the on-board unit in a vehicle when communication with the central location cannot be effected with a receiver.

17. The method of claim 16 further including the step of sending the received signal to the central station when communication with the central station is effected.

* * * * *